United States Patent

O'Cheskey

[15] 3,643,806
[45] Feb. 22, 1972

[54] ADJUSTABLE KNIFE BLADE FOR DRY FILTER CAKE DISCHARGE

[72] Inventor: Theodore H. O'Cheskey, Whittier, Calif.

[73] Assignee: United States Filter Corporation, Whittier, Calif.

[22] Filed: Mar. 24, 1969

[21] Appl. No.: 809,522

[52] U.S. Cl..............................210/327, 210/332, 210/396
[51] Int. Cl..........................................................B01d 29/34
[58] Field of Search....................210/67, 327, 331, 332, 396

[56] References Cited

UNITED STATES PATENTS

| | | | |
|---|---|---|---|
| 1,680,029 | 8/1928 | Sweetland | 210/327 X |
| 1,967,070 | 7/1934 | Walker | 210/327 |
| 2,444,466 | 7/1948 | Peterson | 210/396 |
| 2,885,083 | 5/1959 | Peterson et al. | 210/396 |
| 3,252,577 | 5/1966 | Anderson | 210/396 X |
| 3,371,791 | 3/1968 | Schryver | 210/327 |

*Primary Examiner*—Samih N. Zaharna
*Attorney*—Christie, Parker & Hale

[57] ABSTRACT

An elongated knife blade spans the surface of a filter leaf, with its inner end making a loose fit around the central shaft of the filter. After the filtration process, the blade is held stationary and the filter leaf is rotated under it to remove the filter cake which has accumulated on the leaf. The spacing between the blade and the surface of the leaf is adjustable so that the cake left on the leaf can be set to the desired thickness. The leaf can be rotated relative to the blade during filtration to continuously remove cake from the leaf and thereby increase the concentration of solids in the liquid circulated through the filter.

8 Claims, 6 Drawing Figures

INVENTOR.
THEODORE H. O'CHESKEY
BY
Christie, Parker & Hale
ATTORNEYS

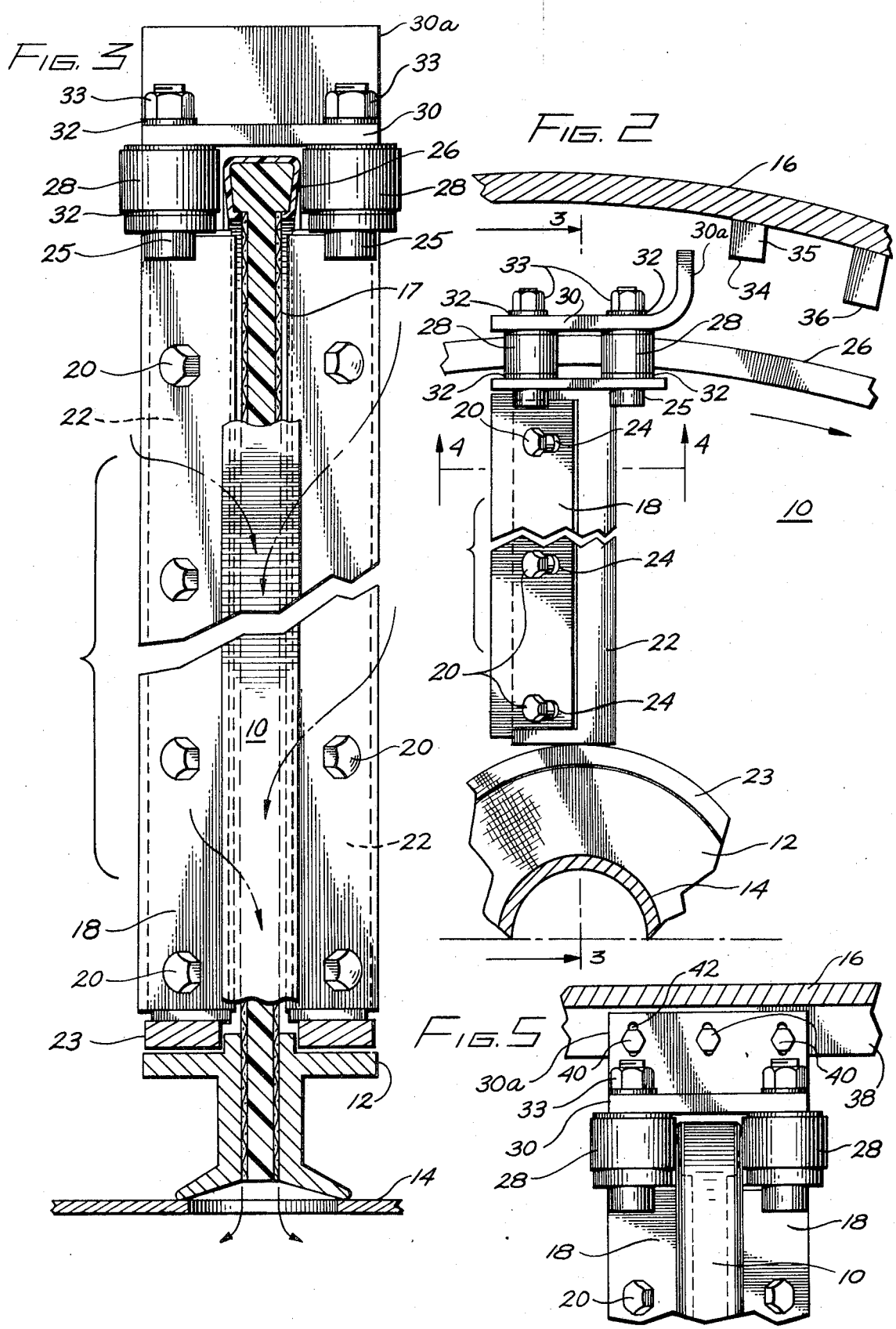

ADJUSTABLE KNIFE BLADE FOR DRY FILTER CAKE DISCHARGE

BACKGROUND OF THE INVENTION

This invention relates to an improvement in rotary pressure leaf filters, and more particularly to an apparatus for removing the cake which accumulates on the outer surfaces of filter leaves during the filtration process.

A conventional pressure leaf filter comprises a plurality of filter leaves mounted on a hollow, rotatable shaft in a cylindrical tank or shell. Liquid to be filtered is introduced into the shell under pressure and forced through the leaves which deliver the filtrate to the hollow shaft for collection. During the filtering process, solids suspended in the liquid accumulate on the surface of the leaves as a cake, and eventually interfere with filtering efficiency. If the filter cake buildup on a leaf is substantial, the pressure drop through the leaf is sufficient to cause the leaf to collapse. Therefore, the filter cake is removed periodically to maintain efficient operation and prevent destructive loading.

Filter cake is usually removed or "sluiced" from the leaves by emptying the filter shell and directing a spray of cleaning liquid under pressure onto the leaf surfaces. However, there are instances where it is desirable to remove filter cake from the leaves in a dry or semidry condition, instead of sluicing it from the leaves. For example, dry filter cake is often a valuable byproduct of the filtration process; consequently, it is desirable to recover the cake intact at the end of a filtering cycle. Furthermore, dry cake discharge is necessary in some applications where the filter cake is incapable of being sluiced from the leaves because of the particular nature of the produce involved.

Removal of dry cake at the end of each cycle also permits reuse of the same precoat materials for succeeding filtration cycles. For example, filter leaves are usually "precoated" before each cycle with a filtering media which enhances the filtering capabilities of the leaves. During the filtering process, the solids removed from the liquid to be filtered collect on the surface of the precoat layer. At the end of a cycle, all accumulated filter cake is removed down to and slightly into the precoat layer. Then, after the filter cake is removed from the filter shell, the remaining precoat layer is removed from the leaves, reslurried, and reapplied to leaf surfaces for reuse as the precoat layer for the next filtration cycle. This process represents a significant savings of filtration time and cost of precoat materials.

Past methods for removing dry cake from filter leaves have not proved satisfactory. This is particularly true where accurate control of cake removal is desired. In some prior available pressure leaf filters, the leaves are removed from the filter shell and replaced during cleaning. This procedure is cumbersome and time-consuming because the entire filtering assembly must be dismantled. Moreover, it does not permit use of the same precoat materials for succeeding filtration cycles. In other pressure leaf filters, dry cake is vibrated from the leaves by an agitator or blown off the leaves with compressed air. These methods likewise prevent accurate control of filter cake removal.

SUMMARY OF THE INVENTION

The apparatus of this invention includes a knife blade disposed adjacent the surface of a filter leaf in the shell of conventional liquid filtration apparatus. Liquid to be filtered is introduced into the shell and forced through the leaf to form a cake on the surface of the leaf. The knife blade extends outwardly from the central portion of the leaf to its periphery and becomes embedded in the filter cake during the filtration process. Means are provided for effecting relative rotation of the blade and the leaf so that the cake is cut off the leaf by the blade. The space between the blade and leaf is adjustable so that the desired amount of cake is removed. Thus, filter cake is rapidly removed from the leaves for recovery or disposal by a device which is simple in construction and easily operable while requiring a minimum of cleaning time.

In the preferred form of the invention, the filter leaf is mounted on an elongated rotatable shaft disposed axially within the shell. The inner end of the knife blade makes a loose fit around the shaft, and the outer end of the blade is preferably supported by rollers which ride on the perimeter of the filter leaf. The filter leaf is keyed to the center shaft and rotates with it during cleaning. The rollers firmly support the end of the knife blade to insure uniform filter cake cutoff. Stop means are secured to the interior of the shell, and during cleaning operations the leaf is rotated with the blade embedded in the cake until the end of the blade strikes the stop means. This prevents the blade from rotating with the leaf so that the filter cake is cut off the leaf as the leaf rotates under the blade.

When the apparatus of this invention is used in filters having a plurality of spaced-apart filter leaves, stop means are secured to the interior of the shell adjacent the periphery of each leaf. Preferably, the stop means of adjacent leaves are angularly displaced from one another so that the filter cake is cut off each leaf at a different location relative to the adjacent leaves. This avoids overloading the motor which rotates the shaft during cleaning, because the loads to which the motor is subjected by each blade engaging its respective stop are spaced instead of applied simultaneously. Since the filter cake is cut off adjacent leaves at different locations, the removed filter cake does not ball up or "bridge" across adjacent leaves and prevent proper cake discharge from the shell.

This invention contemplates a method of filter cake removal which enables filtration apparatus to be used to increase the concentration of solids suspended in a particular liquid. A filter leaf is mounted in the shell of liquid filtration apparatus and an elongated knife blade is disposed adjacent the face of the leaf. The liquid containing the solids is forced into the shell and through the leaf so that a cake of solids is formed on the leaf. Relative rotation of the leaf and blade is produced as the cake is formed so that the solids are continuously cut off the leaf by the blade and reslurried in the liquid within the shell. As a result, the filter acts as a thickener because a heavy concentration of solids builds up in the liquid inside the shell.

BRIEF DESCRIPTION OF THE DRAWINGS

FIG. 2 is a fragmentary plan elevational view of the apparatus of this invention;

FIG. 3 is a fragmentary sectional elevational view, partially broken away, taken on line 3—3 of FIG. 2;

FIG. 5 is an elevational view showing an alternate embodiment of the stop means of this invention.

DESCRIPTION OF THE PREFERRED EMBODIMENT

Figure 1:
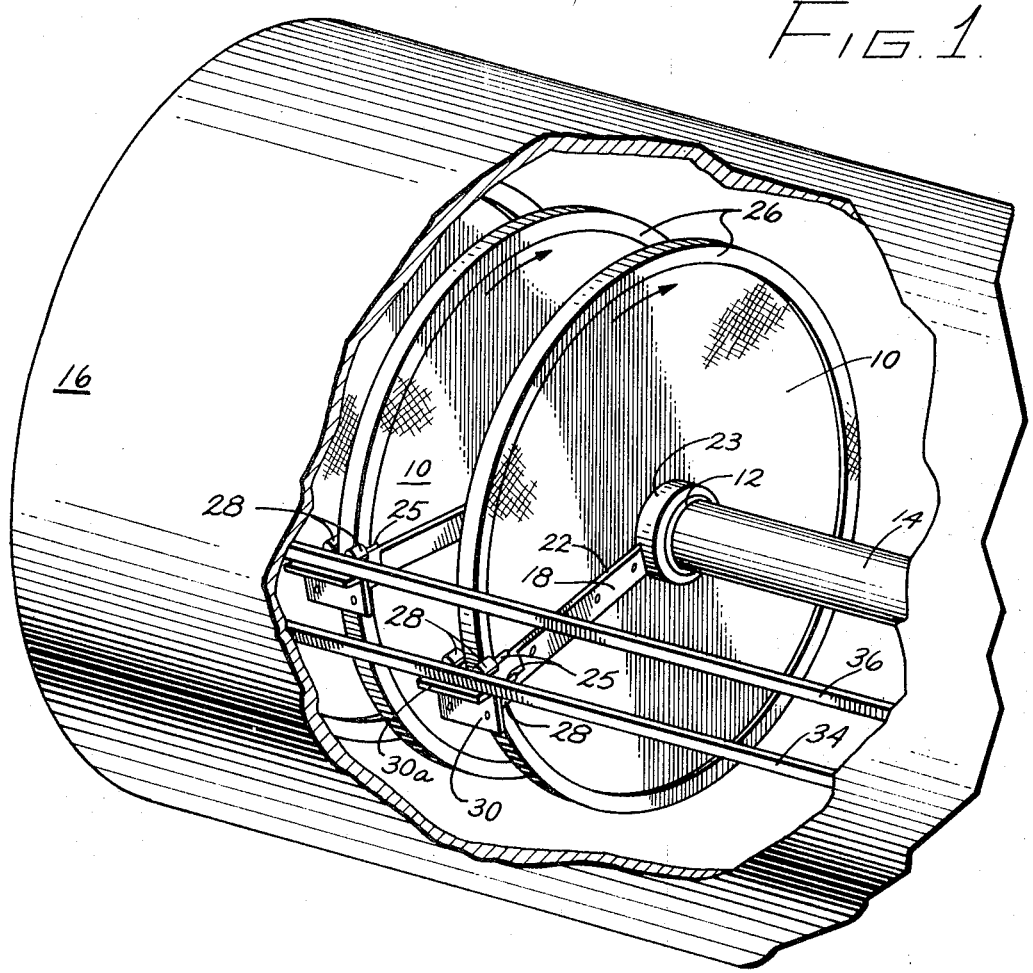
FIG. 1 is a perspective view, partially broken away, showing a conventional filtration shell and the apparatus of this invention.
Figure 4:
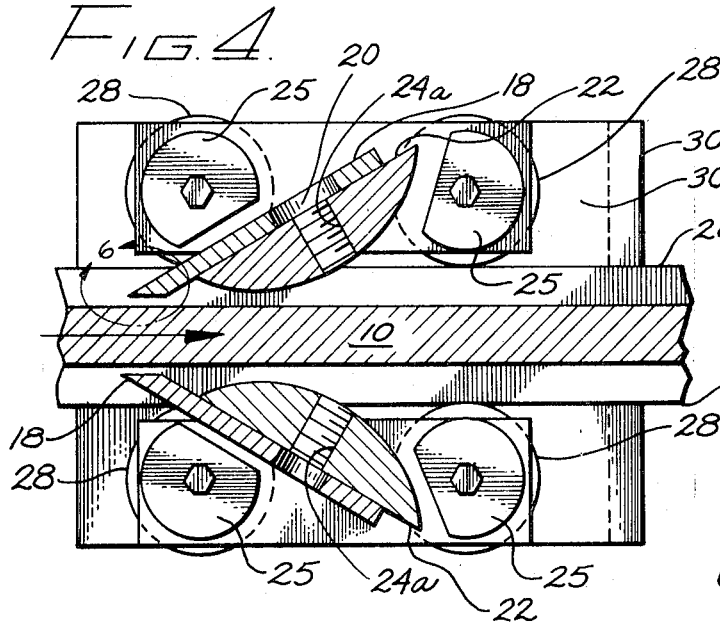
FIG. 4 is a sectional elevational view taken on line 4—4 of FIG. 2.

Referring to the drawings, a substantially circular filter leaf 10 is secured to the hub 12 of an elongated, hollow rotatable shaft 14. The shaft and filter leaf are centrally disposed within a cylindrical filtration tank or shell 16. During operation of the filtration apparatus, liquid to be filtered is introduced into the shell and forced under pressure against each side of filter leaf 10, as indicated by the arrows in FIG. 3. The liquid then passes down through a filtering cloth 17 covering the outer surface of the leaf and flows radially inwardly through the interior of the leaf and into the interior of shaft 14 for collection.

An elongated knife blade 18 is secured by bolts 20 to a flat, elongated carrying bar 22 welded at its inner end to a sleeve 23 which makes a loose fit around hub 12. The bolts pass through a series of spaced-apart slotted holes 24 in the blade, and are screwed into threaded holes 24a in the carrying bar. The slotted holes enable the blade to be moved toward or away from the leaf surface to set the desired thickness of cake remaining on the leaf. Typically, the blade is set to be spaced about one-sixteenth inch from the leaf.

A pair of laterally spaced shafts 25 are welded to the end of the carrying bar and project outwardly past the outer rims 26 of the filter leaf. A separate roller 28 is mounted on each of the shafts 25 to ride on the outer rim of the leaf. A flat, L-shaped bracket 30 having an outwardly projecting arm 30a is secured to the ends of the shafts by washers 32 and hex nuts 33. The bracket spans the periphery of the filter leaf and is similarly secured to another carrying bar and knife blade of identical construction mounted on the opposite face of the filter leaf.

During filtration process, the filter leaf is held stationary and the knife blade hangs free as the filter cake builds up around it on the leaf. The hub is keyed on the shaft so that the hub and the leaf rotate with the shaft. After a filter cake of prescribed thickness is built up, cleaning operations are initiated by emptying the shell and blowing air through the cake to dry it out. The cake is then removed from the leaf by rotating the shaft, and therefore the leaf, in the direction indicated by the arrows in FIGS. 1 and 2. The leaf rotates with the blade embedded in the cake until bracket 30 strikes a stop 34 welded to the interior surface of the shell. The stop is an elongated bar disposed longitudinally along the inner surface of the shell on legs 35 so that it projects outwardly from the surface a distance sufficient to engage the bracket. When the blade engages the stop, it remains stationary while the leaf rotates under it to cut off the filter cake which falls into a trough (not shown) located at the bottom of the shell.

In a multileaf filter, each filter leaf carries its respective pair of knife blades. Preferably, a second elongated stop 36 is longitudinally disposed within the shell adjacent stop 34, and extends further into the shell than stop 34. The arms 30a of alternate brackets 30 are slightly longer than the arms of the remaining brackets so that the shorter arms clear stop 34 and strike stop 36, while the longer arms strike stop 34. In use, the knife blades of alternate leaves engage alternate stops, as shown in FIG. 1. This prevents the sudden overloading of the motor (not shown) which rotates the shaft during cleaning.

FIG. 5 shows an alternate embodiment of the invention wherein the knife blade is adapted to be held in a stationary position adjacent the face of the leaf during the entire filtration process. An elongated bar 38 extending the length of the shell is welded to the inner wall of the shell and projects outwardly from the wall a distance sufficient to engage arms 30a of bracket 30. The arm of the bracket is permanently affixed to the bar by bolts 40 which extend through a series of spaced-apart slotted holes 42 in arm 30a, and are screwed into cooperating threaded holes (not shown) in the bar. The slotted holes enable the blade assembly to move back and forth slightly in the radial direction as the leaf rotates. This loose fit compensates for any eccentricity in the leaf, and for any rotational imbalance in the rotary shaft. This particular embodiment of the invention enables the filter to be used as a liquid-thickening device. That is, a stock of liquid containing thinly distributed solids can be circulated through the filter under pressure to produce an end product having a thick concentration of solid material. The blade is held stationary adjacent the face of the leaf and the leaf is rotated continuously during filtration. A cake of solids builds up on the leaf as the stock of liquid is forced into the shell and through the leaf, and the solids are constantly shoved off the leaf by the blade as the leaf rotates. The removed cake is reslurried in the liquid within the shell, and as the stock of liquid and solids is constantly fed into the shell, the concentration of solids in the shell continuously increases to eventually produce a liquid having a substantial concentration of solids.

Figure 6:
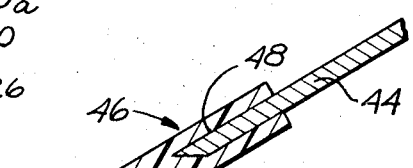
FIG. 6 is a sectional elevational view showing an alternate embodiment of the knife blade of this invention.

The knife blade of this invention is preferably constructed of a strong, corrosion-resistant metal such as stainless steel. However, in some applications it is desirable to construct the blade out of a tough, durable plastic material such as Teflon. This allows adjustment of the blade to remove the complete cake, including any precoat material, without causing undue wear on the filtering cloth 17. FIG. 6 shows an alternate embodiment of the invention wherein the knife blade has a removable plastic edge which can be replaced when worn. An elongated support bar 44 is secured by bolts 20 to carrying bar 22. The bolts pass through a series of spaced-apart slotted holes in the support bar to facilitate moving the bar toward or away from the leaf surface. A replaceable elongated plastic blade member 46 makes a sliding fit over the edge of the support bar adjacent the leaf. The blade member has a longitudinal channel-shaped edge 48 which fits over the support bar, and an opposed longitudinal blade edge 50 for cutting filter cake off the leaf.

I claim:

1. A liquid-filtering apparatus comprising a shell; a filter leaf disposed within the shell; means for forcing liquid into the leaf to form a cake on the leaf; an elongated knife blade disposed adjacent the face of the filter leaf and extending outwardly from the central portion of the leaf to its periphery, the knife blade including an elongated support bar and a replaceable elongated blade member having a longitudinal channel-shaped edge opposite its blade edge for making a sliding fit over the support bar so that the blade member may be removed when worn, the blade member being constructed of polytetrafluoroethylene; means for adjusting the space between the blade member and the surface of the leaf; rollers adapted to ride on the perimeter of the filter leaf for supporting the outer end of the knife blade; stop means secured to the interior of the shell, the knife blade being secured to the stop means; and means for rotating the leaf relative to the knife blade so that the desired amount of cake is cut off the leaf by the blade as the leaf rotates under it.

2. A liquid-filtering apparatus comprising a shell; a plurality of filter leaves in the shell; means for forcing liquid into the leaves to form a cake on the face of each leaf; a separate elongated knife blade disposed adjacent the face of each filter leaf, each knife blade extending outwardly from the central portion of its respective leaf to the periphery of the leaf; means for simultaneously rotating the knife blades and filter leaves relative to the shell; and stop means on the interior of the shell for engaging the moving knife blades in succession at different angularly spaced locations around the interior of the shell to successively prevent the blades from rotating relative to their respective leaves so that filter cake is cut off each leaf by a respective blade at a different location with respect to an adjacent leaf.

3. Apparatus according to claim 2 including means for adjusting the space between each knife blade and the face of its respective filter leaf, the adjusting means including an elongated carrying bar extending outwardly from the central portion of the leaf to its periphery for supporting the knife blade, a plurality of spaced-apart slotted holes extending lengthwise along the blade, matching holes disposed in the surface of the carrying bar adjacent the slotted holes, and fasteners extending through the slotted holes into the holes of the carrying bar to secure the blade to the surface of the carrying bar such that the blade is slidable relative to the surface of the carrying bar toward or away from the face of the leaf.

4. Apparatus according to claim 2 wherein each knife blade comprises an elongated support bar and a replaceable elongated blade member adapted to make a sliding fit over the support bar so the blade member may be removed when worn.

5. Apparatus according to claim 4 wherein each blade member is constructed of plastic material.

6. Apparatus according to claim 2 wherein each knife blade has a hardness less than that of the filter leaf so that the entire filter cake can be removed from the leaf while substantially preventing wear on the filter leaf.

7. Apparatus according to claim 2 wherein each knife blade is supported at its outer end by a separate roller which rides on the periphery of the filter leaf.

8. A liquid-filtering apparatus comprising a shell; a plurality of filter leaves disposed within the shell; means for forcing liquid into the leaves to form a cake on the face of each leaf; a separate elongated knife blade disposed adjacent the face of each filter leaf, each knife blade extending outwardly from the central portion of its respective leaf to the periphery of the leaf; angularly spaced-apart stop means secured to the interior of the shell, each stop means being secured to the shell at a point adjacent a respective one of the filter leaves, with each stop means extending inwardly toward the filter leaves a distance which is different from that of the stop means corresponding to the other filter leaves; a separate stop-engaging means extending outwardly from each knife blade toward a respective one of the stop means, each stop-engaging means extending outwardly a distance which is different from that of the stop-engaging means corresponding to the other knife blades; and means for producing relative rotation of the knife blades and their respective filter leaves so that each stop-engaging means comes in contact with its respective stop means to prevent the blades from rotating with their respective leaves so that filter cake is cut off each leaf by the blade, whereby the stop-engaging means engage the stop means at a plurality of locations about the periphery of the leaves so that cake is cut off each leaf surface at a different location with reference to the adjacent leaves.

* * * * *